US012682253B2

(12) United States Patent
Liu et al.

(10) Patent No.: US 12,682,253 B2
(45) Date of Patent: Jul. 14, 2026

(54) METHOD AND DEVICE FOR CONSTRUCTING DECISION TREE

(71) Applicant: Jingdong City (Nanjing) Technology Co., Ltd., Jiangsu (CN)

(72) Inventors: Yang Liu, Jiangsu (CN); Junbo Zhang, Jiangsu (CN); Mingxin Chen, Jiangsu (CN); Yingting Liu, Jiangsu (CN); Yu Zheng, Jiangsu (CN)

(73) Assignee: Jingdong City (Nanjing) Technology Co., Ltd., Jiangsu (CN)

( * ) Notice: Subject to any disclaimer, the term of this patent is extended or adjusted under 35 U.S.C. 154(b) by 1073 days.

(21) Appl. No.: 17/607,299

(22) PCT Filed: Mar. 3, 2020

(86) PCT No.: PCT/CN2020/077579
§ 371 (c)(1),
(2) Date: Oct. 28, 2021

(87) PCT Pub. No.: WO2020/220823
PCT Pub. Date: Nov. 5, 2020

(65) Prior Publication Data
US 2022/0230071 A1 Jul. 21, 2022

(30) Foreign Application Priority Data
Apr. 30, 2019 (CN) .......................... 201910362975.1

(51) Int. Cl.
*G06N 5/01* (2023.01)
(52) U.S. Cl.
CPC ..................................... *G06N 5/01* (2023.01)

(58) Field of Classification Search
CPC .......... G06N 5/01; G06N 20/20; G06N 20/00; G06F 18/24323
See application file for complete search history.

(56) References Cited

U.S. PATENT DOCUMENTS 11,276,013 B2    3/2022    Jiang et al.
2014/0074765 A1    3/2014    Steck
(Continued)

FOREIGN PATENT DOCUMENTS

CN    103902591 A    7/2014
CN    106991437 A    7/2017
(Continued)

OTHER PUBLICATIONS

Vaidya, Jaideep, et al. "A random decision tree framework for privacy-preserving data mining." IEEE transactions on dependable and secure computing 11.5 (2013): 399-411. (Year: 2013).*
(Continued)

*Primary Examiner* — Matthew Ell
*Assistant Examiner* — Humaira Zahin Mauni
(74) *Attorney, Agent, or Firm* — BLANK ROME LLP

(57) ABSTRACT

Disclosed in the embodiments of the present disclosure are a method and a device for constructing decision trees. A particular embodiment of the method comprises: sending, to at least one client, a request for acquiring statistical information of attribute information of a target category; receiving the statistical information of attribute information of the target category of samples stored by the clients; generating split point information according to the statistical information of attribute information of the target category of samples respectively stored by the clients, and sending the split point information to the at least one client.

18 Claims, 6 Drawing Sheets

(56) References Cited

U.S. PATENT DOCUMENTS

| | | | | |
|---|---|---|---|---|
| 2017/0199902 A1* | 7/2017 | Mishra | .................. | G06F 16/215 |
| 2019/0026489 A1 | 1/2019 | Nerurkar et al. | | |
| 2023/0046255 A1* | 2/2023 | Ferland | .................. | G06N 20/00 |

FOREIGN PATENT DOCUMENTS

| | | | | |
|---|---|---|---|---|
| CN | 107135061 A | | 9/2017 |
| CN | 107590263 A | * | 1/2018 |
| CN | 107818344 A | | 3/2018 |
| CN | 108764273 A | | 11/2018 |
| CN | 109409647 A | | 3/2019 |
| WO | WO-2017/167097 A1 | | 10/2017 |

OTHER PUBLICATIONS

Du, Wenliang, and Zhijun Zhan. "Building decision tree classifier on private data." (2002). (Year: 2002).*

Chen, Jianguo, et al. "A parallel random forest algorithm for big data in a spark cloud computing environment." IEEE Transactions on Parallel and Distributed Systems 28.4 (2016): 919-933. (Year: 2016).*

Vaidya, Jaideep, and Chris Clifton. "Privacy-preserving decision trees over vertically partitioned data." IFIP Annual Conference on Data and Applications Security and Privacy. Berlin, Heidelberg: Springer Berlin Heidelberg, 2005. (Year: 2005).*

Mu, Yashuang, et al. "A parallel C4. 5 decision tree algorithm based on MapReduce." Concurrency and Computation: Practice and Experience 29.8 (2017): e4015. (Year: 2017).*

Teng, Zhouxuan, and Wenliang Du. "A hybrid multi-group privacy-preserving approach for building decision trees." Pacific-Asia Conference on Knowledge Discovery and Data Mining. Berlin, Heidelberg: Springer Berlin Heidelberg, 2007. (Year: 2007).*

"Handling outliers and Null values in Decision tree" by deepguy, classification—Handling outliers and Null values in Decision tree—Data Science Stack Exchange, 2018. (Year: 2018).*

Vaidya, Jaideep, et al. "Privacy-preserving decision trees over vertically partitioned data." ACM Transactions on Knowledge Discovery from Data (TKDD) 2.3 (2008): 1-27. (Year: 2008).*

Zhou, Hucheng, and Bo Zhao. "SparkTree: Push the Limit of Tree Ensemble Learning." (Year: 2017).*

Y. Zhang, et al., "A Multivariate Decision Tree for Big Data Classification of Distributed Data Streams", ACTA Automatica Sinica, vol. 44, No. 6, Jun. 2018, 13 pgs.

K. Sun, et al., "An Enhanced Differential Privacy Data Release Algorithm", Computer Engineering, vol. 43, No. 4, Apr. 2017, 6 pgs.

L. Fang, et al., "A Decision-Tree Classifier Model of Competition in Choosing Split Attribute", Computer Technology and Development, vol. 16, No. 8, Aug. 2006, 4 pgs.

"Decision Tree Learning", Wikipedia, 2017; 5 pgs.

Jian-hua Li, "Cyber Security Meets Artificial Intelligence: A Survey", Frontiers of Information Technology & Electronic Engineering, 2018, 13 pgs.

H. B. McMahan, et al., "Communication-Efficient Learning of Deep Networks from Decentralized Data", Proceedings of the 20th International Conference on Artificial Intelligence and Statistics (AISTATS), 2017; vol. 54, 11 pgs.

S. B. Kotsiantis, "Decision Trees: A Recent Overview", Artif. Intell. Rev.; 2013, 23 pgs.

S. Chou, et al., "MMDT: A Multi-Valued and Multi-Labeled Decision Tree Classifier for Data Mining", Expert Systems with Applications, vol. 28, 2005, pp. 799-812.

International Search Report for PCT/CN2020/077579, dated May 9, 2020, 2 pgs.

Office Action issued in European Patent Application No. 20798206. 7, mailed Mar. 20, 2025, 7 pages.

Caragea Doina et al: "A Framework for Learning from Distributed Data Using Sufficient Statistics and Its Application to Learning Decision Trees", International Journal of Hybrid Intelligent Systems, Apr. 1, 2004, 15 pages.

* cited by examiner

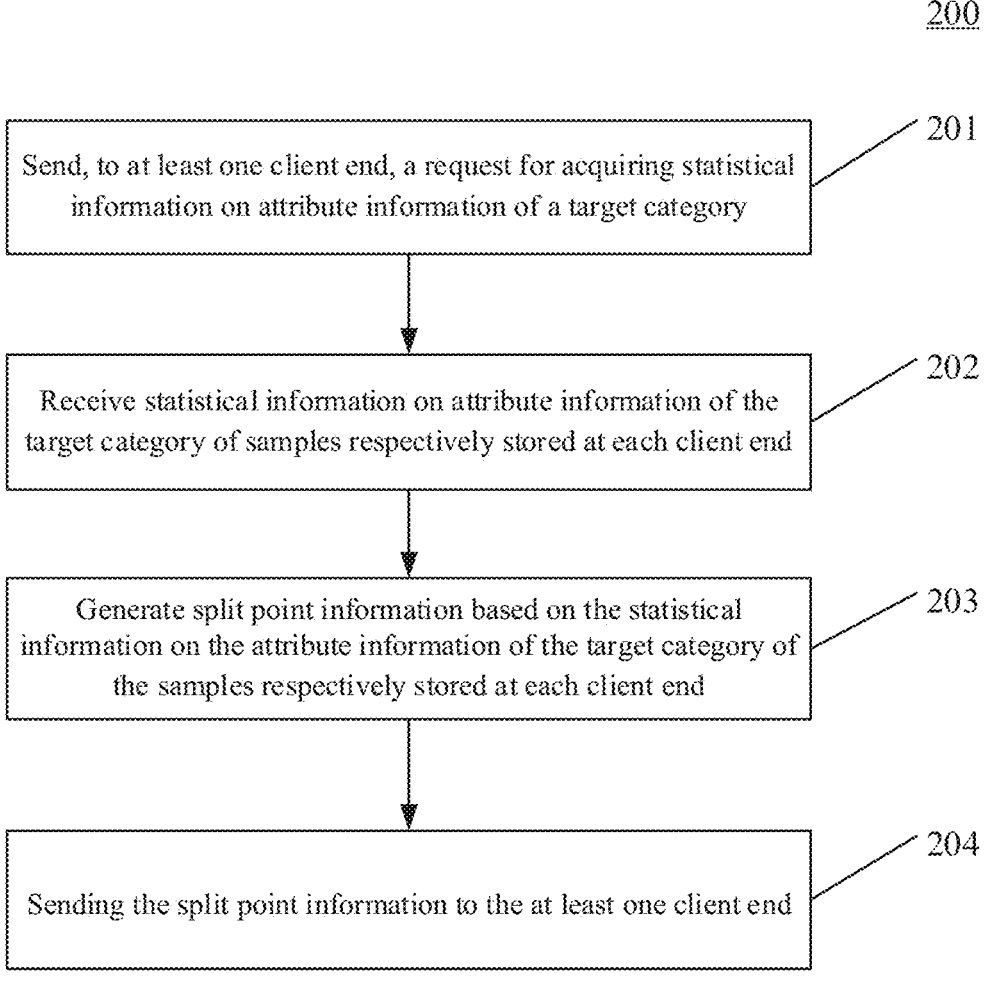

200

Send, to at least one client end, a request for acquiring statistical information on attribute information of a target category          201

Receive statistical information on attribute information of the target category of samples respectively stored at each client end          202

Generate split point information based on the statistical information on the attribute information of the target category of the samples respectively stored at each client end          203

Sending the split point information to the at least one client end          204

Fig. 2

600
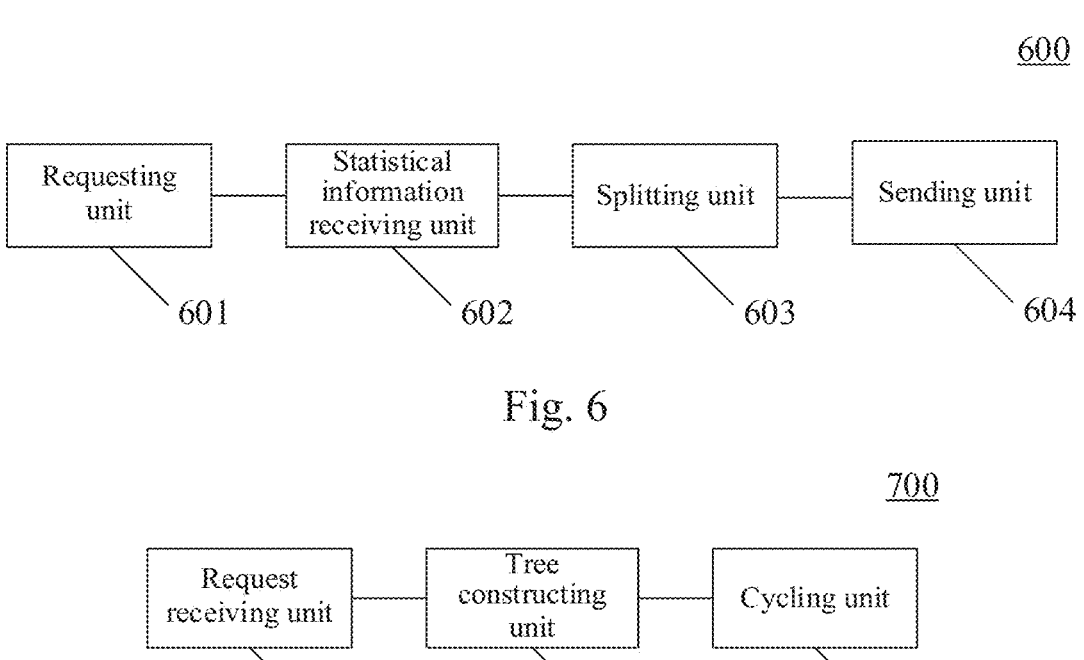
Fig. 6
700
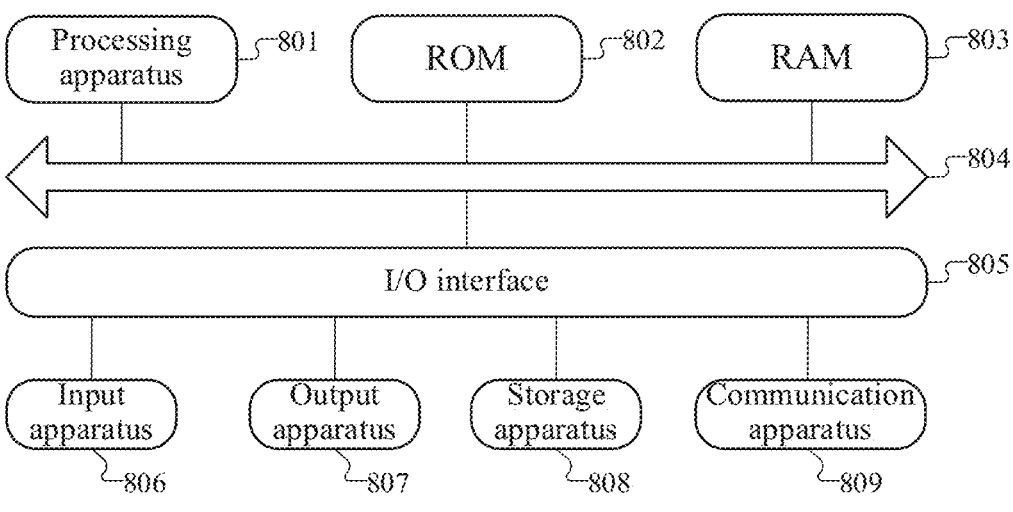
Fig. 7
800
Fig. 8

METHOD AND DEVICE FOR CONSTRUCTING DECISION TREE

This patent application is a U.S. National Stage of International Application No. PCT/CN2020/077579, filed on Mar. 3, 2020, which claims the priority from Chinese Patent Application No. 201910362975.1, filed on Apr. 30, 2019 and entitled "Method and Device for Constructing Decision Tree". Both of the aforementioned applications are hereby incorporated by reference in their entireties.

TECHNICAL FIELD

Embodiments of the present disclosure relate to the field of computer technology, and particularly to a method and apparatus for constructing a decision tree.

BACKGROUND

In the era of artificial intelligence, data is like an energy source for industry development. The core of artificial intelligence is to enable an algorithm to learn a corresponding model according to given data. Without sufficient effective data, the artificial intelligence cannot be efficiently applied in daily life. However, on the other hand, the excessive collection for data brings a crisis of privacy security. Therefore, how to reasonably and lawfully utilize data to provide efficient services for people under the premise of ensuring personal privacy security becomes a research hotspot.

A decision tree is the most commonly used algorithm in machine learning. Different from the inexplicability of a neural network, the decision tree provides a reliable and reasonable model explanation through the importance of features, and provides a more reliable basis for government departments and the financial industry to make decisions. For example, when a bank rejects a loan application and a government department passes a certification, the law requires the corresponding department to provide a reliable basis, for example, on what grounds the application is rejected or passed. The reliable basis can be given by using the decision tree. With the gradual increase of awareness of protecting data privacy, a tree model modeled jointly based on a plurality of data platforms emerges as the times require. The existing tree model modeled jointly is modeled under the premise of protecting user privacy. However, since data is distributed in different platforms, the heterogeneity of samples of the platforms, the imbalance of the data, and the difference in network capacity all cause the problem of high communication cost in a tree construction process, which directly affects the performance of the tree model modeled jointly. Therefore, in practical application, the pressure on the network communication is great, and thus, the requirements of the existing scenario cannot be well met.

SUMMARY

Embodiments of the present disclosure propose a method and apparatus for constructing a decision tree.

According to a first aspect, some embodiments of the present disclosure provide a method for constructing a decision tree, applied to a control end, the method includes: sending, to at least one client end, a request for acquiring statistical information for attribute information of a target category; receiving statistical information for attribute information of the target category of samples respectively stored at each client end; generating split point information based on the statistical information for the attribute information of the target category of the samples respectively stored at the each client end; and sending the split point information to the at least one client end.

According to second aspect, some embodiments of the present disclosure provide a method for constructing a decision tree, applied to a client end, the method includes: receiving, from a control end, a request for acquiring statistical information for attribute information of a target category; performing, based on the target category, tree construction operations: sending statistical information for attribute information of the target category of samples stored locally to the control end; receiving split point information returned by the control end, splitting the samples respectively stored according to the split point information, and storing a node obtained by the splitting to build a decision tree; and outputting the decision tree in response to the node satisfying a preset tree construction termination condition; and in response to the node not satisfying the preset tree construction termination condition, updating the target category according to the split point information, and continuing to perform the tree construction operations based on the updated target category.

According to a third aspect, some embodiments of the present disclosure provide a system for constructing a decision tree, comprising a control end and at least one client end, where the control end is configured to implement any one of the methods according to the first aspect, the at least one client end is configured to implement any one of the method according to the second aspect.

According to a fourth aspect, some embodiments of the present disclosure provide an apparatus for constructing a decision tree, applied to a control end, the apparatus includes: a requesting unit, configured to send, to at least one client end, a request for acquiring statistical information for attribute information of a target category; a statistical information receiving unit, configured to receive statistical information for attribute information of the target category of samples respectively stored at each client end; a splitting unit, configured to generate split point information based on the statistical information for the attribute information of the target category of the samples respectively stored at the each client end; and a sending unit, configured to send the split point information to the at least one client end.

According to a fifth aspect, some embodiments of the present disclosure provide an apparatus for constructing a decision tree, applied to a client end, the apparatus includes: a request receiving unit, configured to receive, from a control end, a request for acquiring statistical information for attribute information of a target category; a tree constructing unit, configured to perform, based on the target category, tree construction operations: sending statistical information for attribute information of the target category of samples stored locally to the control end; receiving split point information returned by the control end, splitting the samples respectively stored according to the split point information, and storing a node obtained by the splitting to build a decision tree, and outputting the decision tree in response to the node satisfying a preset tree construction termination condition; and a cycling unit, configured to update the target category according to the split point information in response to the node not satisfying the preset tree construction termination condition, and continue to perform the tree construction operations based on the updated target category.

According to a sixth aspect, some embodiments of the present disclosure provide an electronic device, the electronic device includes: one or more processors; and a storage apparatus, configured to store one or more programs, where the one or more programs, when executed by the one or more processors, cause the one or more processors to implement the method according to any one of the methods according to the first aspect.

According to a seventh aspect, some embodiments of the present disclosure provide a computer readable medium, storing a computer program, where the program, when executed by a processor, implements any one of the methods according to the first aspect.

BRIEF DESCRIPTION OF THE DRAWINGS

After reading detailed descriptions of non-limiting embodiments given with reference to the following accompanying drawings, other features, objectives and advantages of the present disclosure will be more apparent:

FIG. 2 is a flowchart of a method for constructing a decision tree according to an embodiment of the present disclosure;

FIG. 6 is a schematic structural diagram of an apparatus for constructing a decision tree according to an embodiment of the present disclosure:

FIG. 7 is a schematic structural diagram of an apparatus for constructing a decision tree according to another embodiment of the present disclosure; and FIG. 8 is a schematic structural diagram of a computer system of an electronic device adapted to implement embodiments of the present disclosure.

DETAILED DESCRIPTION OF EMBODIMENTS

Embodiments of the present disclosure are further described below in detail by combining the accompanying drawings. It may be appreciated that embodiments described herein are merely used for explaining the relevant invention, rather than limiting the invention. In addition, it should also be noted that, for ease of description, only the parts related to the relevant invention are shown in the accompanying drawings.

It should be noted that embodiments in the present disclosure and the features in the embodiments may be combined with each other on a non-conflict basis. Embodiments of the present disclosure will be described below in detail with reference to the accompanying drawings.

Figure 1:
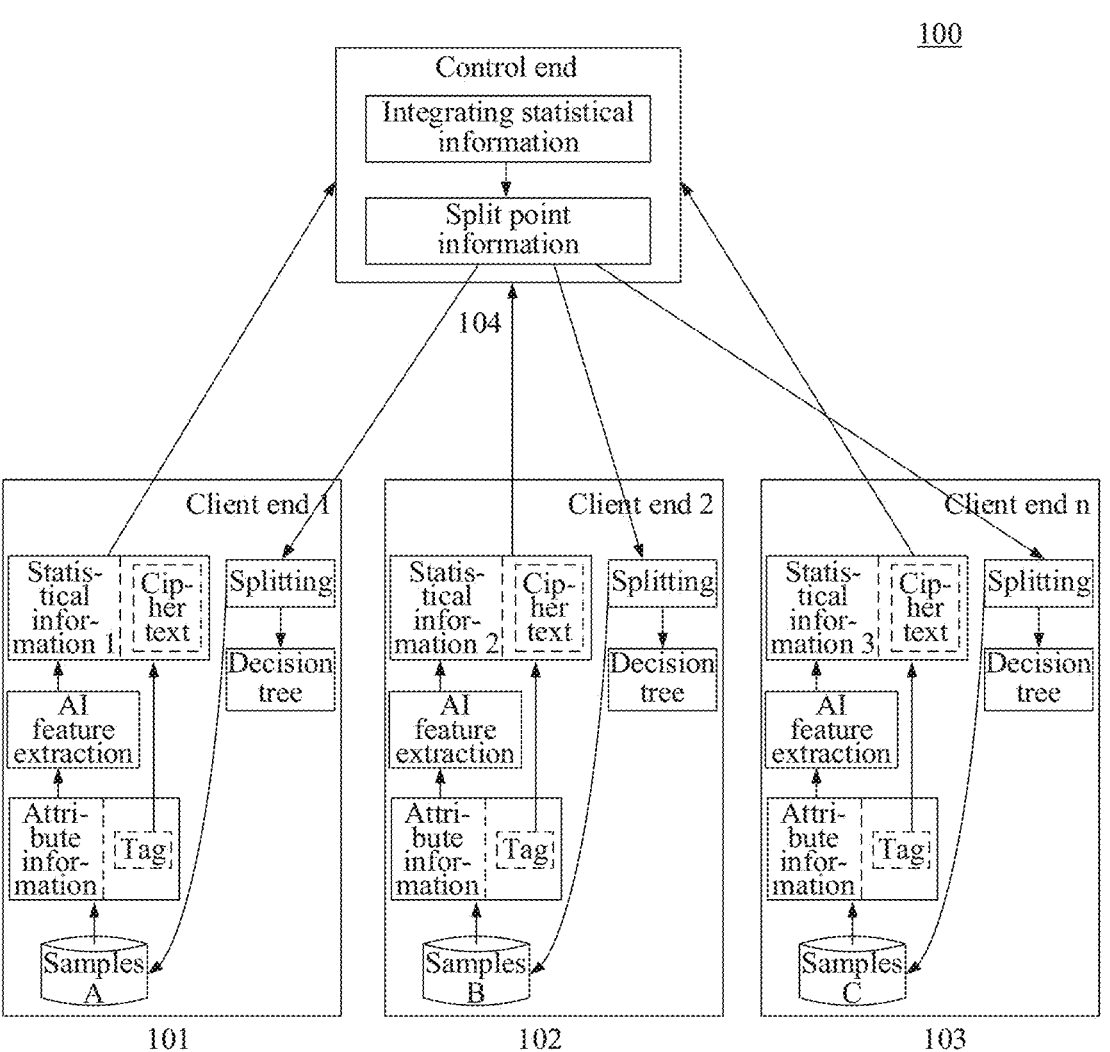
FIG. 1 is a diagram of an exemplary system architecture in which an embodiment of the present disclosure may be applied.

FIG. 1 illustrates an exemplary system architecture 100 in which a method for constructing a decision tree or an apparatus for constructing a decision tree according to embodiments of the present disclosure may be applied.

As shown in FIG. 1, the system architecture 100 may include client end(s) 101, 102, 103, and a control end 104. A network serves as a medium providing a communication link between the client end(s) 101, 102, 103 and the control end 104. The network may include various types of connections, for example, wired or wireless communication links, or optical fiber cables.

A user may use the client end(s) 101, 102, 103 to interact with the control end 104 via the network, to receive or send messages, etc. The client end(s) 101, 102, 103 may store samples used to train a decision tree. Each sample includes attribute information and a tag. The statistical information for the attribute information and the statistical information for the tag may be obtained through a neural network or a statistical method. Here, the tag may be encrypted in the form of a cipher text, and then reported to the control end together with the statistical information for the attribute information.

A decision tree is a prediction model. The decision tree represents a mapping relationship between an object attribute and an object value. A bifurcation path in the tree represents a possible attribute value, and each leaf node corresponds to a value of an object represented by a path from a root node to the leaf node. A decision tree has only a single output. If it is desired that the decision tree has a plurality of outputs, an independent tree may be built to process and generate different outputs.

When a plurality of data owning parties (e.g., an enterprise, a government organization) want to integrate their respective data to train a machine learning model, that the original data owned by each party cannot be export from the local is ensured while a unified model is built. The difference between the effect of the model and the effect of a data aggregation model is required to be small enough.

An application scenario of some embodiments of the present disclosure is one of federated learning techniques, that is, horizontal federated learning. The horizontal federated learning demands that the user characteristics contained by each platform are substantially the same, but the user samples are different. The loan service of regional banks is taken as an example. A regional bank A has information about age, information about asset, information about fund product, information about loan repayment, etc. of some customers, and these data is stored in the client end 101. A regional bank B has the information about the same characteristics of some other customers, and these data is stored in the client end 102. A regional bank C has the information about the same characteristics of some other customers, and these data is stored in the client end 103. However, the data each held by regional banks A, B and C is insufficient to construct a complete and reliable discriminative model for discriminating whether to lend to a certain customer. Therefore, the banks A, B and C all hope to use each other's data for joint modeling. However, due to legal restrictions, the data of both sides cannot be aggregated together. At this time, the modeling based on a plurality of data platforms under the premise of no exchange of the original data information becomes the key method to solve this problem.

The control end 104 may receive the statistical information for the attribute information sent from the client end(s) 101, 102, 103. The control end 104 may perform processing such as analysis on data such as the received statistical information for the attribute information (decryption will be required if the data is encrypted), and feed back the processing result (e.g., a split point and a split attribute) to the client end(s). The client end(s) constructs a decision tree using the split point and the split attribute. Each client end may randomly adopt sample subset(s) to generate a plurality of individual decision trees, and then, these individual decision trees are integrated through a voting method to form a random forest model.

The decision trees, the random forest derived from the decision trees and a tree-based GBM (gradient boosting model) are all composed of basic individual decision trees. In the process of building the decision tree, what is the most expensive calculation is how to find an optimal split point to make the impurity (which may be a Gini coefficient, an information gain, or the like) of data split according to a current split point decreased most. In addition, the parallel algorithm for modeling a tree model jointly based on a plurality of data platforms also requires a lot of time to find the optimal split point. Therefore, how to reduce the computational cost of the finding of the optimal split point becomes one of problems required to be solved. The extreme random forest in ensemble learning applies randomness to the selection for a split point. The effectiveness of the random forest is mainly reflected in the reduction of variance. The random forest performs majority voting by using a plurality of decision trees constructed by sub-data obtained through filtering with replacement, to determine a final prediction result. The extreme random forest applies the same implementation, except that the randomness of the extreme random forest is reflected in the selection for the split point. For the selection, the optimal split point of a single decision tree is not emphasized, the split point is determined by integrating the plurality of decision trees, thereby reducing the determination error as a whole.

It should be noted that the control end may be hardware or software. When being the hardware, the control end may be implemented as a distributed control-end cluster composed of a plurality of control ends, or as a single control end. When being the software, the control end may be implemented as a plurality of pieces of software or a plurality of software modules (e.g., software or software modules for providing a distributed service), or as a single piece of software or a single software module, which will not be specifically defined here.

It should be noted that the method for constructing a decision tree provided by embodiments of the present disclosure may be jointly performed by the client end(s) 101, 102, 103 and the control end 104, and correspondingly, the apparatus for constructing a decision tree may be provided in the client end(s) 101, 102, 103 and the control end 104, which will not be specifically defined herein.

It should be appreciated that the numbers of the client ends and the control ends in FIG. 1 are merely illustrative. Any number of client ends and control ends may be provided based on actual requirements.

Further referring to FIG. 2, FIG. 2 illustrates a flow 200 of a method for constructing a decision tree according to an embodiment of the present disclosure is applied to a control end. The method for constructing a decision tree includes the following steps.

Step 201, sending, to at least one client end, a request for acquiring statistical information for attribute information of a target category.

In this embodiment, an executing body (e.g., the control end shown in FIG. 1) of the method for constructing a decision tree may send, by means of a wired connection or a wireless connection, the request for acquiring the statistical information for the attribute information of the target category to the at least one client end. The attribute information may include characteristics such as {Age, Income}={32, 22K}. The target category refers to a category to which attribute information of a sample belongs, for example, age, income. When splitting is performed for the first time, the control end may randomly select a category from a plurality of candidate categories as the target category.

Alternatively, after a split attribute is obtained by performing step 203, the split attribute is determined as the target category.

Step 202, receiving statistical information for attribute information of the target category of samples respectively stored at each client end.

In this embodiment, the method in the present disclosure does not require the detailed attribute information, but the statistical information for the attribute information. Each client end only needs to send the statistical information for certain attribute information to the control end, for example, the maximum value of characteristic Age in data of the client end A is 60 years old and the minimum value is 40 years old, and the maximus value of characteristic Age in data of the client end B is 20 years old and the maximum value is 50 years old, A and B only need to respectively send these data to the control end.

The statistical information may further include statistical information for a tag of at least one category. The statistical information for the tag may include the number of tags and proportions of the tags, for example, the number of tags and the proportions of the tags of samples belonging to the target category and another category.

Alternatively, the statistical information received by the control end may be encrypted, and needs to be decrypted for use.

Step 203, generating split point information based on the statistical information for the attribute information of the target category of the samples respectively stored at the each client end.

Figure 4A:
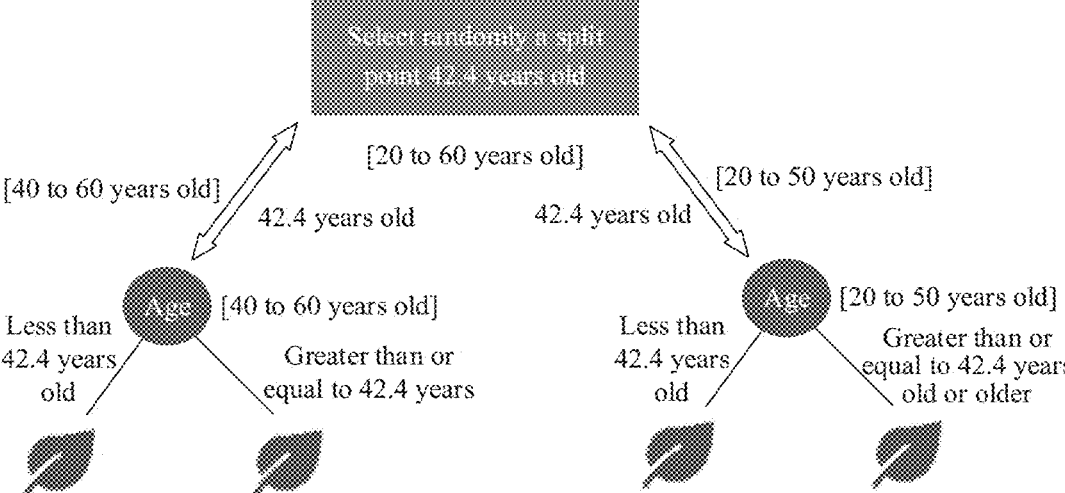
FIGS. 4*a* and 4*b* are schematic diagrams of a split point selection in the method for constructing a decision tree according to the present disclosure.

In this embodiment, the split point information may include a split value and a split attribute. A maximum value and a minimum value of the attribute information of the target category of the samples stored by the each client end are respectively integrated, to obtain an overall maximum value and an overall minimum value of the attribute information of the target category. The split value is selected from between the overall minimum value and the overall maximum value. The split value may be randomly selected from between the overall minimum value and the overall maximum value. Or, the average value of the maximum value and the overall minimum value may be used as the split value. Alternatively, an intermediate value is determined according to the numbers of maximum values and minimum values uploaded by different client ends, to be used as the split value. The way in which the split value is selected will not be defined here. If the received data is encrypted, the control end needs to decrypt the received data for use. As shown in FIG. 4a, the control end decrypts and processes the received encrypted data, to obtain an overall minimum value that is 20 years old and an overall maximum value that is 60 years old. Then, the control end randomly selects a split value 42.4 from between 20 and 60, and then issues the corresponding split value to a node which participates in in the each client end. The each client end partitions sample data according to the obtained split value. To ensure the security of the information, the split value may be sent to the client end after being encrypted.

In the above scheme, when the statistical information for the attribute information is encrypted, in addition to the traditional key encryption method, other encryption modes such as a homomorphic encryption mode may be adopted, thereby preventing the control end from acquiring the data content directly.

In some alternative implementations of this embodiment, for each candidate category in a candidate category set, a decreased value of an impurity of data split according to the candidate category is obtained according to statistical information for a tag of attribute information of the candidate category of the samples respectively stored at the each client end. A candidate category with a maximum decreased value is determined as the split attribute.

The control end integrates the statistical information for the tag that is reported by the at least one client end, to obtain an overall statistical information for the tag. A tag breach is taken below as an example. Statistical information for a tag of attribute information belonging to the target category and X category: the client end A reports 50 breaches and 50 non-breaches, and that the proportion of breach is 50%; the client end B reports 30 breaches and 70 non-breaches, and that the proportion of breach is 30%. After integrating, the overall statistical information for the tag is obtained: 80 breaches, 120 non-breaches, and that the proportion of breach is 40%. For statistical information for a tag of attribute information belonging to the target category and Y category, the client end A reports 40 breaches and 60 non-breaches, and that the proportion of breach is 40%. The client end B reports 20 breaches and 80 non-breaches, and that the proportion of breach is 20%. After the integrating, the overall statistical information for the tag is obtained: 60 breaches, 140 non-breaches, and that the proportion of breach is 30%.

The impurity may be expressed by a Gini value, as shown below:

$$Gini = 1 - \sum_{i=1}^{n} p_i^2.$$

Here, Gini denotes the Gini value, Pi denotes a proportion of the number of categories i, and n denotes the number of categories. A binary classification example is taken as an example, the Gini value is equal to 0.5 when the numbers of two categories are equal. The Gini value is equal to 0 when node data belongs to the same category. The larger the Gini value is, the more impure the data is.

An initial impurity is calculated according to the statistical information for the tag that is reported according to the target category. Then, for candidate categories in the candidate category set, expected impurities are calculated successively. The difference value between the initial impurity and the expected impurity is used as the decreased value of the impurity. A candidate category with the maximum decreased value is determined as the split attribute. For the detailed method, reference may be made to the existing technology. The detailed method will not be repeatedly described here.

For the above example, according to the statistical information for the tag of the attribute information belonging to the target category and X category, the Gini value is obtained: $1-(0.4^2+0.6^2)=0.48$. According to the statistical information for the tag of the attribute information belonging to the target category and Y category, the Gini value is obtained: $1-(0.3^2+0.7^2)=0.42$. It can be seen that, the impurity of the attribute information belonging to the target category and X category is greater than the impurity of the attribute information belonging to the target category and Y category. Their initial impurities are the same, and therefore, the Y category with the lower impurity is selected as the split attribute.

Step 204, sending the split point information to the at least one client end.

In this embodiment, the calculated split point information may be sent to the each client end reporting the statistical information. The each client end constructs a decision tree according to the split point information. The decision tree constructed by the each client end is the same. When determining that a termination condition is not satisfied, the client end would still report the statistical information for attribute information of re-partitioned samples in batches. Then, the control end performs steps 202-204 to generate split point information in batches, and then returns the split point information to the client end.

Figure 3:
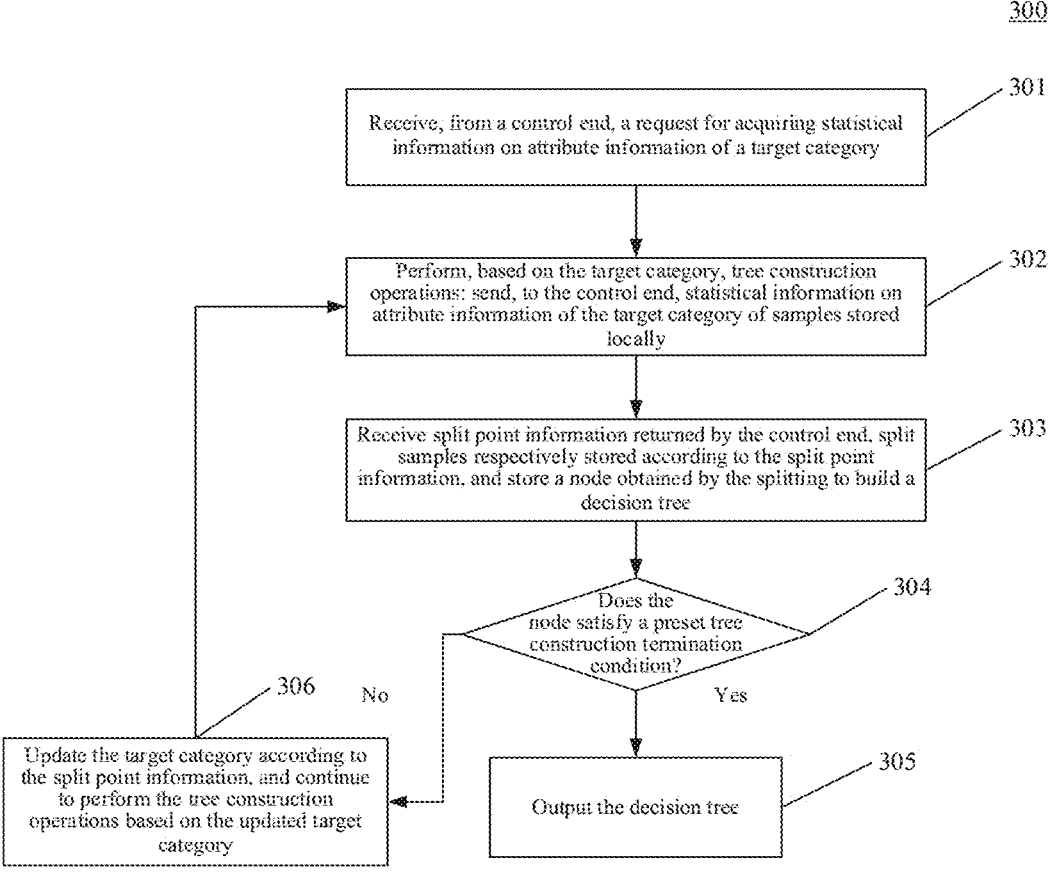
FIG. 3 is a flowchart of a method for constructing a decision tree according to another embodiment of the present disclosure.

Further referring to FIG. 3, FIG. 3 illustrates a flow 300 of a method for constructing a decision tree, applied to a client end, according to an embodiment of the present disclosure. The method for constructing a decision tree includes the following steps:

Step 301, receiving, from a control end, a request for acquiring statistical information for attribute information of a target category.

In this embodiment, an executing body (e.g., the client ends shown in FIG. 1) of the method for constructing a decision tree may receive, from the control end, the request for acquiring the statistical information for the attribute information of the target category, by means of a wired connection or a wireless connection. The attribute information may include characteristics such as {Age, Income}={32, 22K}. The target category refers to a category to which attribute information of a sample belongs, for example, age, income. The control end may randomly select a category from a plurality of candidate categories as a target category used when splitting is performed for the first time.

Based on the target category, the following tree construction steps 302-306 are performed.

Step 302, sending, to the control end, statistical information for attribute information of the target category of samples stored locally.

In this embodiment, the method does not require the detailed attribute information, but statistical information for the attribute information. Each client end only needs to send the statistical information for certain attribute information to the control end, for example, the maximum value of characteristic Age in data of the client end A is 60 years old and the minimum value is 40 years old, and the maximus value of characteristic Age in data of the client end B is 20 years old and the maximum value is 50 years old, A and B only need to respectively send these data to the control end.

The statistical information may further include statistical information for a tag of at least one category. The statistical information for the tag may include the number of tags and proportions of the tags, for example, the number of tags and the proportions of the tags of samples belonging to the target category and another category.

Alternatively, for some information that is easy to leak, the client end may send the information to the control end in an encryption mode, for example, tag information such as a tag breach and a tag loan. The client end may encrypt the numbers and/or proportions of tags of samples belonging to a certain category and send the encrypted numbers and/or proportions to the control end. For example, in a client end A, there are 20 breach samples and 30 non-breach sample in the samples belonging to the category Age. The statistical information (the proportion of the tag breach is 40%, 20 breaches and 30 non-breaches) are encrypted to be sent to the control end. The client end may also encrypt all statistical information, and then send the encrypted statistical information to the control end.

Step 303, receiving split point information returned by the control end, splitting respectively stored sample according to the split point information, and storing a node obtained by the splitting, to build a decision tree.

In this embodiment, the split information generated in step 203 is received. The split point information may include a split value and a split attribute. The samples are re-partitioned according to the split attribute and the split value, and then, statistical information is reported in batches. The attribute information of the samples includes discrete and continuous information. For discrete data, splitting is performed according to an attribute value, and each attribute value corresponds to one split node. For a continuous attribute, the general approach is to sort data according to the attribute, and then partition the data into several intervals such as [0,10], [10,20] and [20,30], and each interval corresponds to one node. If an attribute value of the data falls within an interval, the data belongs to the node corresponding to the interval. These nodes constitute a decision tree. The control end continues to calculate the split point information, and then sends the split point information to the client end, until a preset tree construction termination condition is satisfied.

Step 304, determining whether the node satisfies a preset tree construction termination condition.

Figure 4B:
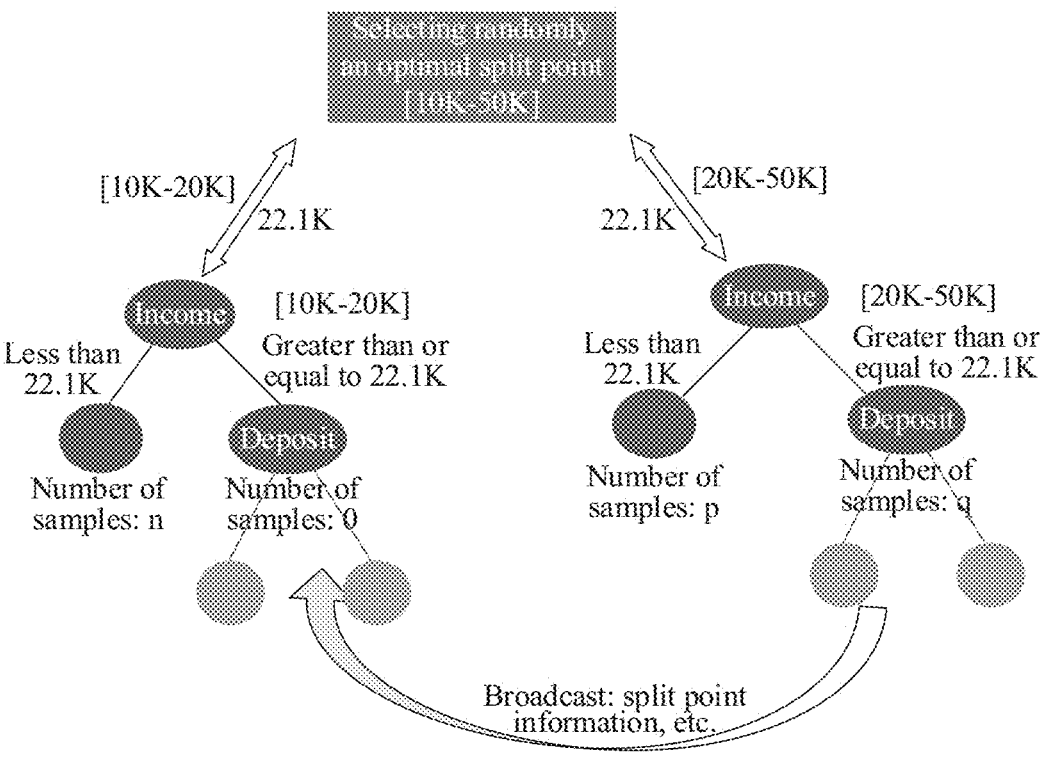

In this embodiment, the tree construction termination condition includes at least one of: the sum of the numbers of samples under identical nodes in at least one client end controlled by the control end being less than a predetermined parameter value; or a depth of a built decision tree exceeding a preset depth value. The control end may acquire the number of samples under each node of each client end. Even if the number of samples under a node in a certain client end is null, the number of samples under an identical node in another client end that is not null may be used to continue the tree construction operation. As shown in FIG. 4b, a client end of which the number of samples is null may receive broadcast information from a client end of which the number of samples is not null or from a control end, and the broadcast information includes split point information.

After the tree construction termination condition is satisfied, participating nodes terminate the tree construction process at each current platform, to ensure that the decision trees built by the participating nodes are identical.

Step 305, outputting the decision tree if the node satisfies the preset tree construction termination condition.

In this embodiment, if the node satisfies the preset tree construction termination condition, a final decision tree is obtained. When the final decision tree is used to perform sample prediction, since the structure of the decision trees built by the each client end are identical, information exchanging is not required, but only a local prediction is required. For example, by inputting the user information: age 40, income 10K into the decision tree, that the tag of the user is breach can be predicted.

Step 306, updating the target category according to the split point information if the node does not satisfy the preset tree construction termination condition, and continuing to perform the tree construction steps 302-306 based on the updated target category.

In this embodiment, the tree construction process is repeated until the built node satisfies the preset tree construction termination condition.

In some alternative implementations of this embodiment, different sample subsets are randomly selected to generate at least one decision tree. The at least one decision tree is combined into a random forest model. A random forest is a classifier containing a plurality of decision trees, and the category output from the random forest is determined by the mode of the categories output from several trees. Each time only one decision tree is constructed by randomly selecting a sample subset, and then a plurality of decision trees are constituted. For example, the client end has 100 samples, and respectively generates three decision trees according to 50 samples in three times, to constitute a random forest model.

In some alternative implementations of this embodiment, the method further includes: receiving user information of a to-be-predicted user, the user information including at least one kind of attribute information; and performing voting on the user information by the random forest model, to obtain a tag of the to-be-predicted user. During the prediction, the to-be-predicted information is inputted into the three decision trees described in the above example, to obtain results respectively. The voting is performed on the results, to determine what type the data belongs to (voting mechanisms including a one vote veto overall, a majority rule, and a weighted majority rule).

According to the method provided in above embodiments of the present disclosure, the model modeled jointly based on an extreme random forest introduces the randomness of the extreme random forest into the joint modeling process. Under the premise of ensuring the data privacy of the user, the use of the structural features of the decision tree guarantees the sameness and uniqueness of the decision trees constructed by a plurality of participating nodes.

Figure 5:
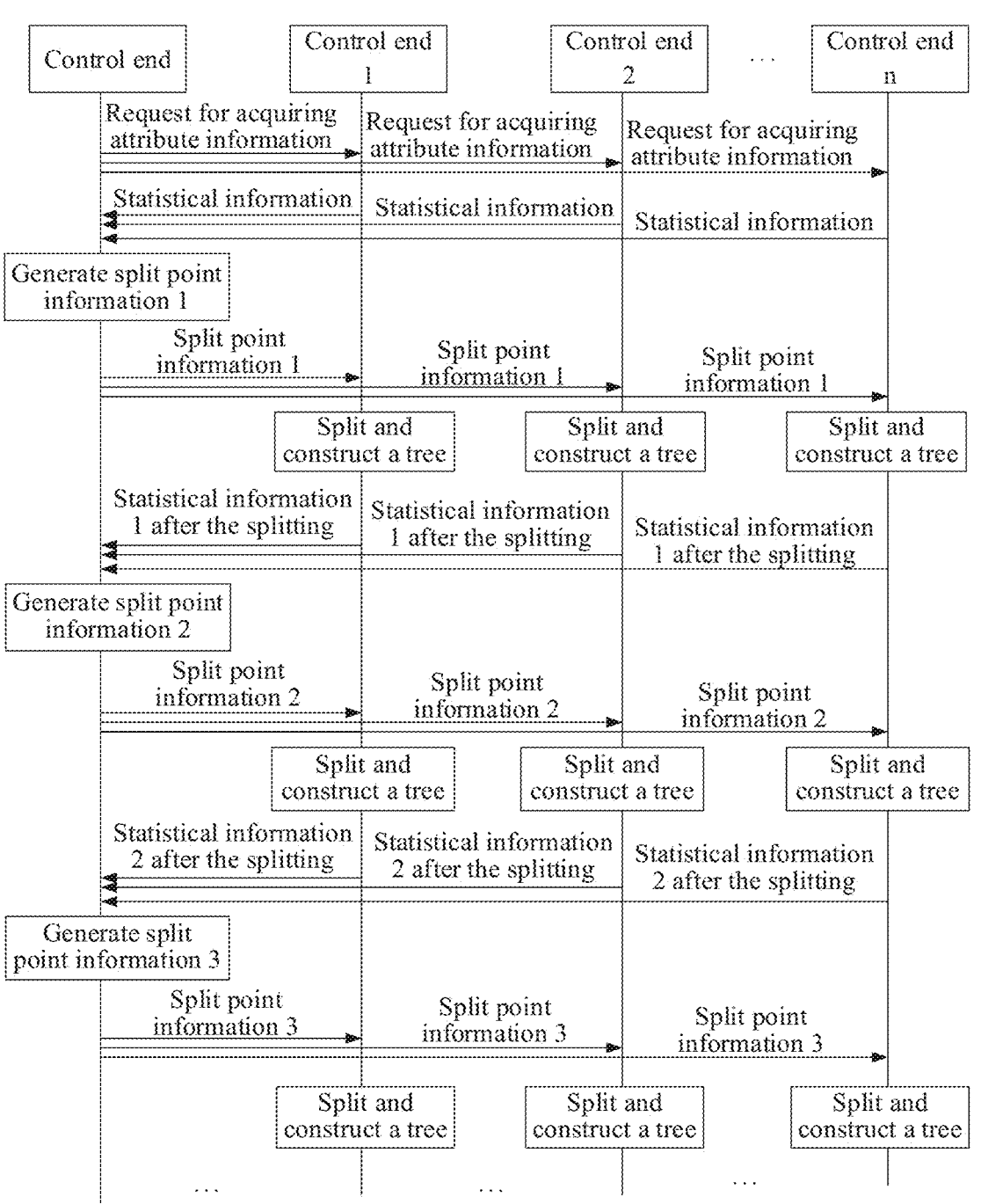
FIG. 5 is a schematic diagram of an application scenario of the method for constructing a decision tree according to some embodiments of the present disclosure.

Further referring to FIG. 5, FIG. 5 is a schematic diagram of an application scenario of the method for constructing a decision tree according to this embodiment. In the application scenario of FIG. 5, a control end first randomly selects a target category (e.g., age) from a candidate category set, and then sends a request for acquiring statistical information for attribute information of a target category to a client end participating in training of a decision tree. Each client end needs to send statistical information for the attribute information (e.g., age) of the target category and a tag (e.g., breach) to the control end, the statistical information including a maximum value and a minimum value. After receiving the statistical information, the control end integrates the statistical information, to obtain a maximum value (an upper bound) and a minimum value (a lower bound) of unified attribute information of all client ends. Then, the control end randomly selects a value from between the maximum value and the minimum value as a split value, and calculates a split attribute according to the statistical information for the tag in the statistical information. The control end combines the split value and the split attribute into split point information, to issue the split point information to all participating nodes, and the client end constructs a decision tree according to the split point information. The tree construction process is repeated until the number of constructed trees satisfies a set parameter condition. Each client end may obtain a single decision tree. Each client end may generate a plurality of decision trees by randomly selecting sample subsets, and combine the plurality of decision trees into a random forest. The random forest is used to predict a tag of a user.

Further referring to FIG. 6, as an implementation of the method shown in the above drawings, an embodiment the present disclosure provides an apparatus for constructing a decision tree applied to a control end. The embodiment of the apparatus corresponds to the embodiment of the method shown in FIG. 2. The apparatus may be applied in various electronic devices.

As shown in FIG. 6, the apparatus 600 for constructing a decision tree in this embodiment comprises: a requesting unit 601, a statistical information receiving unit 602, a splitting unit 603 and a sending unit 604. Here, the requesting unit 601 is configured to send, to at least one client end, a request for acquiring statistical information for attribute information of a target category. The statistical information receiving unit 602 is configured to receive statistical information for attribute information of the target category of samples respectively stored at each client end. The splitting unit 603 is configured to generate split point information based on the statistical information for the attribute information of the target category of the samples respectively stored at the each client end. The sending unit 604 is configured to send the split point information to the at least one client end.

In this embodiment, for specific processes of the requesting unit 601, the statistical information receiving unit 602, the splitting unit 603 and the sending unit 604 in the apparatus 600 for constructing a decision tree, reference may be made to step 201, step 202, step 203 and step 204 in the corresponding embodiment of FIG. 2.

In some alternative implementations of this embodiment, the statistical information comprises a maximum value and a minimum value, and the split point information comprises a split value. The splitting unit 603 is further configured to: integrate a maximum value and a minimum value of the attribute information of the target category of the samples respectively stored at the each client end, to obtain an overall maximum value and an overall minimum value of the attribute information of the target category; and select the split value from between the overall minimum value and the overall maximum value.

In some alternative implementations of this embodiment, the statistical information further comprises statistical information for a tag, and the split point information further comprises a split attribute. The splitting unit 603 is further configured to: obtain, for each candidate category in a candidate category set, a decreased value of an impurity of data split according to the each candidate category, based on statistical information for a tag of attribute information of the candidate category of the samples respectively stored at the each client end; and determine a candidate category with a maximum decreased value as the split attribute.

In some alternative implementations of this embodiment, the requesting unit 601 is further configured to: select randomly a category from the candidate category set as the target category in response there being no split attribute; otherwise, determine the split attribute as the target category; and send the request for acquiring the statistical information for the attribute information of the target category to the at least one client end.

In some alternative implementations of this embodiment, the apparatus further comprises an encrypting and decrypting unit (not shown), configured to communicate with the at least one client end in an encryption mode.

Further referring to FIG. 7, as an implementation of the method shown in the above drawings, an embodiment of the present disclosure provides an apparatus for constructing a decision tree applied to a client end. The embodiment of the apparatus corresponds to the embodiment of the method shown in FIG. 3. The apparatus may be applied in various electronic devices.

As shown in FIG. 7, the apparatus 700 for constructing a decision tree in this embodiment comprises: a request receiving unit 701, a tree constructing unit 702 and a cycling unit 703. Here, the request receiving unit 701 is configured to receive, from a control end, a request for acquiring statistical information for attribute information of a target category. The tree constructing unit 702 is configured to perform, based on the target category, tree construction operations: sending statistical information for attribute information of the target category of samples stored locally to the control end; receiving split point information returned by the control end, splitting the samples respectively stored according to the split point information, and storing a node obtained by the splitting to build a decision tree; and outputting the decision tree in response to the node satisfying a preset tree construction termination condition. The cycling unit 703 is configured to update the target category according to the split point information in response to the node not satisfying the preset tree construction termination condition, and continue to perform the tree construction operations based on the updated target category.

In some alternative implementations of this embodiment, the tree construction termination condition comprises at least one of: the sum of the numbers of samples of identical nodes in at least one client end controlled by the control end being less than a predetermined parameter value; or a depth of a built decision tree exceeding a preset depth value.

In some alternative implementations of this embodiment, the tree constructing unit 702 is further configured to receive, in response to the number of samples of the node being null, an information broadcast from a node a number of samples thereof being not null, to continue to build the decision tree.

In some alternative implementations of this embodiment, the statistical information comprises statistical information for a tag. The apparatus further comprises an encrypting and decrypting unit (not shown), configured to encrypt the statistical information for the tag.

In some alternative implementations of this embodiment, the encrypting and decrypting unit is further configured to encrypt the statistical information for the tag in a homomorphic encryption mode.

In some alternative implementations of this embodiment, the apparatus 700 further comprises a combining unit (not shown), configured to: select randomly different sample subsets to generate at least one decision tree; and combine the at least one decision tree into a random forest model.

In some alternative implementations of this embodiment, the apparatus 700 further comprises a predicting unit (not shown), configured to: receive user information of a to-be-predicted user, the user information including at least one kind of attribute information; and perform voting on the user information through the random forest model, to obtain a tag of the to-be-predicted user.

Referring to FIG. 8, FIG. 8 is a schematic structural diagram of an electronic device (the control end or the client end shown in FIG. 1) 800 adapted to implement embodiments of the present disclosure. The terminal device/server shown in FIG. 8 is merely an example, and should not bring any limitation to the functions and the scope of use of the embodiments of the present disclosure.

As shown in FIG. 8, the electronic device 800 includes a processing apparatus (e.g., a central processing unit and a graphics processing unit) 801, which may execute various appropriate actions and processes in accordance with a program stored in a read-only memory (ROM) 802 or a program loaded into a random access memory (RAM) 803 from a storage apparatus 808. The RAM 803 further stores various programs and data required by operations of the electronic device 800. The processing apparatus 801, the ROM 802 and the RAM 803 are connected to each other through a bus 804. An input/output (I/O) interface 805 is also connected to the bus 804.

The following portions are connected to the I/O interface 805: an input portion 806 including a touch screen, a touch pad, a keyboard, a mouse, a camera, a microphone, an accelerometer, a gyroscope etc.; an output portion 807 comprising a liquid crystal display device (LCD), a speaker, a vibrator etc.; a storage portion 808 including a magnetic tape, a hard disk and the like; and a communication portion 809. The communication device 809 may allow the electronic device 800 to exchange data with other devices through wired or wireless communication. Although FIG. 8 shows an electronic device 800 having various portions, it should be understood that it is not required to implement or have all of the illustrated portions. It may alternatively be implemented or provided with more or fewer portions. Each box shown in FIG. 8 may denote one portion or a plurality of portions as needed.

In particular, according to embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 809, or may be installed from the storage portion 808, or may be installed from the ROM 802. The computer program, when executed by the central processing unit (CPU) 801, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), fiber, a portable compact disk read only memory (CD-ROM), an optical memory, a magnet memory or any suitable combination of the above. In embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The above computer readable medium may be the computer readable medium included in the above electronic device, or a stand-alone computer readable medium not assembled into the electronic device. The above computer readable medium carries one or more programs. The one or more programs, when executed by the electronic device, cause the electronic device to: send, to at least one client end, a request for acquiring statistical information for attribute information of a target category; receive statistical information for attribute information of the target category of samples respectively stored at each client end; generate split point information based on the statistical information for the attribute information of the target category of the samples respectively stored at the each client end; and send the split point information to the at least one client end. Alternatively, the one or more programs, when executed by the electronic device, cause the electronic device to: receive, from a control end, a request for acquiring statistical information for attribute information of a target category; perform, based on the target category, tree construction operations: sending statistical information for attribute information of the target category of samples stored locally to the control end; receiving split point information returned by the control end, splitting the samples respectively stored according to the split point information, and storing a node obtained by the splitting to build a decision tree; and outputting the decision tree in response to the node satisfying a preset tree construction termination condition; and in response to the node not satisfying the preset tree construction termination condition, update the target category according to the split point information, and continue to perform the tree construction operations based on the updated target category.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The described units involved in embodiments of the present disclosure may be implemented by means of software or hardware. The described units may also be provided in a processor. For example, the processor may be described as: a processor comprising a requesting unit, a statistical information receiving unit, a splitting unit and a sending unit. Here, the names of these units do not in some cases constitute a limitation to such units themselves. For example, the requesting unit may alternatively be described as "a unit for sending a request for acquiring statistical information for attribute information of a target category to at least one client end."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for constructing a decision tree based on a plurality of data platforms under the premise of no exchange of original data information, the method comprising:

sending, by a control end that is hardware, to a plurality of client ends, a request for acquiring statistical information for attribute information of a target category;

receiving, by the control end and from the plurality of client ends, encrypted statistical information for attribute information of the target category of samples respectively stored at each client end of the plurality of client ends, wherein the encrypted statistical information is obtained by encrypting statistical information in a homomorphic encryption mode, and the statistical information comprises a maximum value and a minimum value for a tag of at least one category, a number of tags, and proportions of the tags;

decrypting the encrypted statistical information to obtain the statistical information of the plurality of client ends;

generating, by the control end, a split value and a split attribute based on maximum values and minimum values for the tag of the at least one category obtained from the plurality of client ends and numbers of the tags and proportions of the tags obtained from the plurality of client ends;

sending the split value and the split attribute to the plurality of client ends for constructing identical decision trees at the plurality of client ends, and constructing, by the plurality of client ends, the identical decision trees based on the split value and the split attribute.

2. The method according to claim 1, wherein the generating the split value and the split attribute comprises:

integrating maximum values and minimum values of the attribute information of the target category of the samples respectively stored at the plurality of client ends, to obtain an overall maximum value and an overall minimum value of the attribute information of the target category; and selecting the split value from between the overall minimum value and the overall maximum value.

3. The method according to claim 2, wherein the generating the split value and the split attribute further comprises:

for each candidate category in a candidate category set, obtaining a decreased value of an impurity of data split according to the each candidate category, based on statistical information of the plurality of client ends; and determining a candidate category with a maximum decreased value as the split attribute.

4. The method according to claim 3, wherein the sending the request used for acquiring statistical information for the attribute information of the target category to the plurality of client ends comprises:

in response to there being no split attribute, selecting randomly a category from the candidate category set as the target category;

in response to there being the split attribute, determining the split attribute as the target category; and sending the request for acquiring the statistical information for the attribute information of the target category to the plurality of client ends.

5. The method according to claim 1, further comprising:

communicating with the plurality of client ends in an encryption mode.

6. An electronic device, comprising:

one or more processors; and a storage apparatus, configured to store one or more programs, wherein the one or more programs, when executed by the one or more processors, cause the one or more processors to implement the method according to claim 1.

7. A non-transitory computer readable storage medium, storing a computer program, wherein the program, when executed by a processor, implements the method according to claim 1.

8. The method according to claim 1, wherein the sending the split value and the split attribute to the plurality of client ends comprises:

sending the split value and the split attribute to the plurality of client ends until a preset tree construction termination condition is satisfied, wherein each client end repartitions the samples respectively stored at the each client end according to the split value and the split attribute to obtain nodes constituting a decision tree of the each client end, wherein each node of the decision tree corresponds to one split value, and reports statistical information to the control end in batches.

9. The method according to claim 8, wherein the tree construction termination condition comprises:

a sum of numbers of samples of identical nodes of the identical decision trees in the plurality of client ends being less than a predetermined parameter value.

10. The method according to claim 1, wherein the method further comprises: acquiring, by the control end, a number of samples under each node in nodes constituting a decision tree constructed at each client end, wherein each node of the decision tree corresponds to one split value;

in response to a number of samples under a node in a client end is null, receiving, by the client end, the split value and the split attribute broadcasted from a client end whose number of samples is not null and continuing constructing the decision tree using the received split value and the received split attribute.

11. A method for constructing a decision tree based on a plurality of data platforms under the premise of no exchange of original data information, the method comprising:

receiving, from a control end that is hardware, a request for acquiring statistical information for attribute information of a target category;

performing, based on the target category, tree construction operations: encrypting, in a homomorphic encryption mode, statistical information for attribute information of the target category of samples stored locally to obtain encrypted statistical information, sending the encrypted statistical information to the control end, wherein the statistical information comprises a maximum value and a minimum value for a tag of at least one category, a number of tags, and proportions of the tags; receiving a split value and a split attribute returned by the control end, splitting the samples respectively stored according to the split value and the split attribute, and storing a node obtained by the splitting to build a decision tree; and outputting the decision tree in response to the node satisfying a preset tree construction termination condition; and in response to the node not satisfying the preset tree construction termination condition, updating the target category according to the split value and the split attribute, and continuing to perform the tree construction operations based on the updated target category, wherein the split value and the split attribute are generated by the control end based on maximum values and minimum values for the tag of the at least one category obtained from a plurality of client ends and numbers of the tags and proportions of the tags obtained from the plurality of client ends, and decision trees constructed at the plurality of client ends are identical to each other.

12. The method according to claim 11, wherein the tree construction termination condition comprises at least one of:

a sum of numbers of samples under identical nodes in the plurality of client ends being less than a predetermined parameter value.

13. The method according to claim 11, further comprising:

in response to a number of samples of the node being null, receiving an information broadcast from another node a number of samples thereof being not null, to continue to build the decision tree.

14. The method according to claim 11, wherein the method further comprises:

encrypting the number of tags and the proportions of the tags.

15. The method according to claim 11, further comprising:

selecting randomly different sample subsets to generate at least one decision tree; and combining the at least one decision tree into a random forest model.

16. An electronic device, comprising:

one or more processors; and a storage apparatus, configured to store one or more programs, wherein the one or more programs, when executed by the one or more processors, cause the one or more processors to implement the method according to claim 11.

17. A non-transitory computer readable storage medium, storing a computer program, wherein the program, when executed by a processor, implements the method according to claim 11.

18. A system for constructing a decision tree based on a plurality of data platforms under the premise of no exchange of original data information, the system comprising a control end and a plurality of client ends, wherein the control end is a hardware and is configured to implement first operations, the first operations comprising:

sending, to the plurality of client ends, a request for acquiring statistical information for attribute information of a target category;

receiving encrypted statistical information for attribute information of the target category of samples respectively stored at each client end of the plurality of client ends, wherein the encrypted statistical information is obtained by encrypting statistical information in a homomorphic encryption mode, and the statistical information comprises a maximum value and a minimum value for a tag of at least one category, a number of tags, and proportions of the tags;

decrypting the encrypted statistical information to obtain the statistical information of the plurality of client ends;

generating a split value and a split attribute based on maximum values and minimum values for the tag of the at least one category obtained from the plurality of client ends and numbers of the tags and proportions of the tags obtained from the plurality of client ends;

sending the split value and the split attribute to the plurality of client ends for constructing identical decision trees at the plurality of client ends; and the plurality of client ends are configured to implement second operations, the second operations comprising:

receiving, from the control end, the request for acquiring statistical information for attribute information of the target category;

performing, based on the target category, tree construction operations: sending the encrypted statistical information for the attribute information of the target category of the samples stored locally to the control end; receiving the split value and the split attribute returned by the control end, splitting the samples respectively stored according to the split value and the split attribute, and storing a node obtained by the splitting to build a decision tree; and outputting the decision tree in response to the node satisfying a preset tree construction termination condition; and in response to the node not satisfying the preset tree construction termination condition, updating the target category according to the split value and the split attribute, and continuing to perform the tree construction operations based on the updated target category.

* * * * *